United States Patent
Wang et al.

(10) Patent No.: US 9,170,977 B2
(45) Date of Patent: Oct. 27, 2015

(54) METHOD AND SYSTEM FOR MANAGING SERVER INFORMATION DATA BASED ON POSITION INFORMATION OF A SERVER BASEBOARD

(75) Inventors: Xin Wang, Shenzhen (CN); Xunfeng Cao, Shenzhen (CN); Haibing Huang, Shenzhen (CN); Wenpeng Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 557 days.

(21) Appl. No.: 13/613,523

(22) Filed: Sep. 13, 2012

(65) Prior Publication Data

US 2013/0007249 A1    Jan. 3, 2013

Related U.S. Application Data (63) Continuation of application No. PCT/CN2011/077478, filed on Jul. 22, 2011.

(30) Foreign Application Priority Data

Jul. 26, 2010 (CN) .......................... 2010 1 0237500

(51) Int. Cl.
*G06F 15/173* (2006.01)
*G06F 15/16* (2006.01)
(Continued)

(52) U.S. Cl.
CPC .............. *G06F 15/161* (2013.01); *H04L 41/12* (2013.01); *H04L 61/609* (2013.01); *H04L 67/18* (2013.01)

(58) Field of Classification Search
CPC ........ H04L 67/18; H04L 61/609; H04L 41/12
USPC .......................................... 709/223–224, 220
See application file for complete search history.

(56) References Cited

U.S. PATENT DOCUMENTS 7,930,425 B2 * 4/2011 Bailey et al. .................. 709/224
8,166,539 B2 * 4/2012 Pan ............................... 709/224
(Continued)

FOREIGN PATENT DOCUMENTS

| CN | 1946027 A | 4/2007 |
|---|---|---|
| CN | 1960261 A | 5/2007 |

(Continued)

OTHER PUBLICATIONS

International Search Report: mailed Oct. 13, 2011; PCT/CN2011/077478.

(Continued)

*Primary Examiner* — Bharat N Barot
(74) *Attorney, Agent, or Firm* — Harness, Dickey & Pierce, P.L.C.

(57) ABSTRACT

Systems and methods are provided for managing server information data An information data management system obtains position information of each server baseboard from a controller storing the position information of the server baseboard, and establishes a corresponding relationship between the position information and an information data index of a rack server. The position information comprises slot information and rack information of the server baseboard. An information data configuring system obtains the position information, the information data index and the corresponding relationship between the position information and the information data index from the information data management system.

19 Claims, 3 Drawing Sheets

(51) Int. Cl.
  *H04L 29/12* (2006.01)
  *H04L 12/24* (2006.01)
  *H04L 29/08* (2006.01)

(56) References Cited

U.S. PATENT DOCUMENTS

| | | | |
|---|---|---|---|
| 8,301,801 B2 * | 10/2012 | Lu | 709/224 |
| 8,458,305 B2 * | 6/2013 | Elzur et al. | 709/223 |
| 2005/0138439 A1 | 6/2005 | Rothman et al. | |
| 2005/0198235 A1 | 9/2005 | Kumar et al. | |
| 2007/0186086 A1 * | 8/2007 | Lambert et al. | 713/1 |
| 2008/0101351 A1 | 5/2008 | Nguyen et al. | |
| 2008/0195581 A1 | 8/2008 | Ashmore et al. | |
| 2012/0023210 A1 * | 1/2012 | Lai et al. | 709/223 |
| 2013/0138804 A1 * | 5/2013 | Hsien | 709/224 |

FOREIGN PATENT DOCUMENTS

| | | |
|---|---|---|
| CN | 1968168 A | 5/2007 |
| CN | 1972491 A | 5/2007 |
| CN | 101217394 A | 7/2008 |
| CN | 101232395 A | 7/2008 |

OTHER PUBLICATIONS

Chinese Office Action for Application No. 2010102375009 dated Jul. 26, 2010, and a Concise Explanation of Relevance in English thereof.
International Preliminary Report for Application No. PCT/CN2011/077478 dated Jan. 29, 2013.

* cited by examiner

METHOD AND SYSTEM FOR MANAGING SERVER INFORMATION DATA BASED ON POSITION INFORMATION OF A SERVER BASEBOARD

FIELD OF THE INVENTION

The present invention relates to server management fields, and more particularly, to a method and a system for managing server information data.

BACKGROUND OF THE INVENTION

In modern enterprises, there is generally a large amount of enterprise information data of various kinds, especially for devices, pipelines and/or instruments. For example, with respect to a device, there is a device label and/or a device specification. Therefore, the enterprise information data should be indexed to be managed. Rack server, as one kind of enterprise information data, has been widely used in production and living of various fields and industries. Currently, multiple server baseboards are arranged on the rack server via slots. Thus, after the server baseboard is inserted into the rack of the rack server, a human operator such as a rack server manager has to number the information data of the server baseboard to manage the server baseboard. At present, it is required to bind the position information of each server baseboard on the rack server and an information data index to manage the information data of the server baseboards on the rack server. After the server baseboard is inserted into the rack server, a human operator needs to manually obtain the position information of the server baseboard. As such, the traditional manual way of managing the server information data is inconvenient and inefficient.

SUMMARY OF THE INVENTION

Examples of the present invention provide a method for managing server information data, so as to obtain position information of a server automatically and to avoid the inconvenience brought by manual operations.

Examples of the present invention also provide a system for managing server information data, so as to obtain position information of a server automatically and avoid inconvenience brought out by manual operation.

According to an embodiment of the present invention, a method for managing server information data is provided. The method includes:

obtaining, by an information data management system, position information of a server baseboard from a controller storing the position information of the server baseboard, and establishing a corresponding relationship between the position information and an information data index of a rack server; and obtaining, by an information data configuring system, the position information, the information data index and the corresponding relationship between the position information and the information data index from the information data management system.

According to another embodiment of the present invention, a system for managing server information data is provided. The system includes:

a controller, adapted to storing position information of a server baseboard;

an information data management system, connected with the controller, adapted to obtain the position information of the server baseboard from the controller, and establish a corresponding relationship between the position information and an information data index of a rack server; and an information data configuring system, connected with the information data management system, adapted to obtain the position information, the information data index and the corresponding relationship between the position information and the information data index from the information data management system.

According to still another embodiment of the present invention, a non-transitory machine-readable storage medium is provided. The non-transitory machine-readable storage medium includes machine-readable instructions executable by a processor to:

obtain position information of a server baseboard from a controller storing the position information of the server baseboard, establish a corresponding relationship between the position information and an information data index of a rack server; and provide the information data index and the corresponding relationship between the position information and the information data index to an information data configuring system.

It can be seen from the above that, embodiments of the present invention provide systems and methods for managing server information data intelligently and efficiently. For example, the information data configuration system automatically obtains the position information of the server baseboard on the rack server and correlates the position information with the detected information data index of the rack server. Then, the information data configuration system provides the position information, the information data index, and the corresponding relationship between the position information and the information data index to the information data management system.

BRIEF DESCRIPTION OF THE DRAWINGS

The drawings used in the embodiments will be briefly introduced hereinafter to make the technical solution of the embodiments of the present invention clearer. Apparently, the following drawings are merely some examples of the present invention. Those with ordinary skill in the art would obtain many other drawings based on the following drawings without inventive work.

DETAILED DESCRIPTION OF THE INVENTION

The present invention will be described in further detail hereinafter with reference to accompanying drawings and embodiments to make the technical solution therein clearer.

The following embodiments are merely some examples and do not form all embodiments. Variations obtained by those skilled in the art without inventive work fall within the scope of the present invention.

Embodiments of the present invention provide a method for managing server information data. Hereinafter, the method for managing server information data will be described in further detail with reference to FIG. 1 to FIG. 3.

Figure 1:
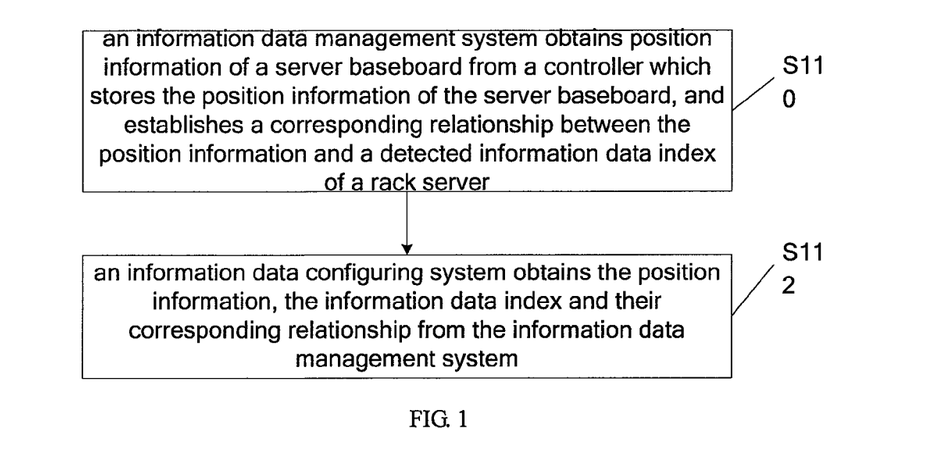
FIG. 1 is a flowchart illustrating a method for managing server information data according to a first embodiment of the present invention.

FIG. 1 is a flowchart illustrating a method for managing server information data according to a first embodiment of the present invention. As shown in FIG. 1, the method includes the following steps.

In step S110, an information data management system obtains position information of each server baseboard from a controller which stores the position information of the server baseboard, and establishes a corresponding relationship between the position information and a detected information data index of a rack server.

Specifically, the information data management system may detect the information data index of the rack server where the server baseboard is inserted when the rack server is power on. The information data index may be a frame number of the rack server where the server baseboard is inserted.

Specifically, the position information may include rack position information (usually referred to as Rack ID) and slot information (usually referred to as Slot ID). The rack information may further include the following fields: "city+engine room+floor+rack row+rack number". The slot information may include the following field: "seat". Therefore, complete position information of the server baseboard may include: "city+engine room+floor+rack row+rack number+seat". For example, a position of the server baseboard may be "Shenzhen Telecom Shahe IDC engine room 5th floor row A rack 03 seat 1". In particular, each filed in the position information may be denoted by a digital code in the embodiment of the present invention. For example, for the field "city", different cities may correspond to different digital codes. For example, "Shenzhen" may be denoted by "755", "Dongguan" may be denoted by "769". Other fields in the position information may be expressed in a similarly way. For example, the aforementioned "Shenzhen Telecom Shahe IDC engine room 5th floor row A rack 03 seat 1" may be expressed by digital codes "7550105010301".

In a practical application, the controller storing the position information of the server baseboard may be a Rack Management Controller (RMC) or a Baseboard Management Controller (BMC).

In a practical application, the information data management system may establish the corresponding relationship between the position information and the information data index of the rack server through a table.

In step S112, an information data configuring system obtains the position information, the information data index and their corresponding relationship from the information data management system.

Thus, the inconvenience of the manual operation is avoided by automatically obtaining the position information of the server.

Furthermore, the information data configuring system saves the position information, the information data index and their corresponding relationship obtained from the information data management system in real time, and provides a query interface for a user to query about information data in the information data configuring system.

Specifically, the information data configuring system stores the corresponding relationship between the position information of the server baseboard on the rack server and the information data index. Thus, the human operator is able to obtain the corresponding relationship from the information data configuring system. A query interface may be provided in the information data configuring system to facilitate the operator to obtain the corresponding relationship.

In a practical application, after a server baseboard is inserted into the rack server, the information data configuring system may automatically obtain the position information of the server baseboard through the above steps S110 and S112. And then, the information data configuring system stores the information data index of the rack server corresponding to the position information in an enterprise database. The position and information data index of the server baseboard may be displayed to the operator for convenience.

Various management activities may include the following. After a server baseboard migrates, a resource configuring system may automatically find the new position of the server baseboard after its migration. This facilitates the operator to record the migration history data of the server baseboard. After a server baseboard retires, the resource configuring system may automatically delete the position information corresponding to the server baseboard, the information data index of the rack server, as well as the history data with respect to the server baseboard.

Figure 2:
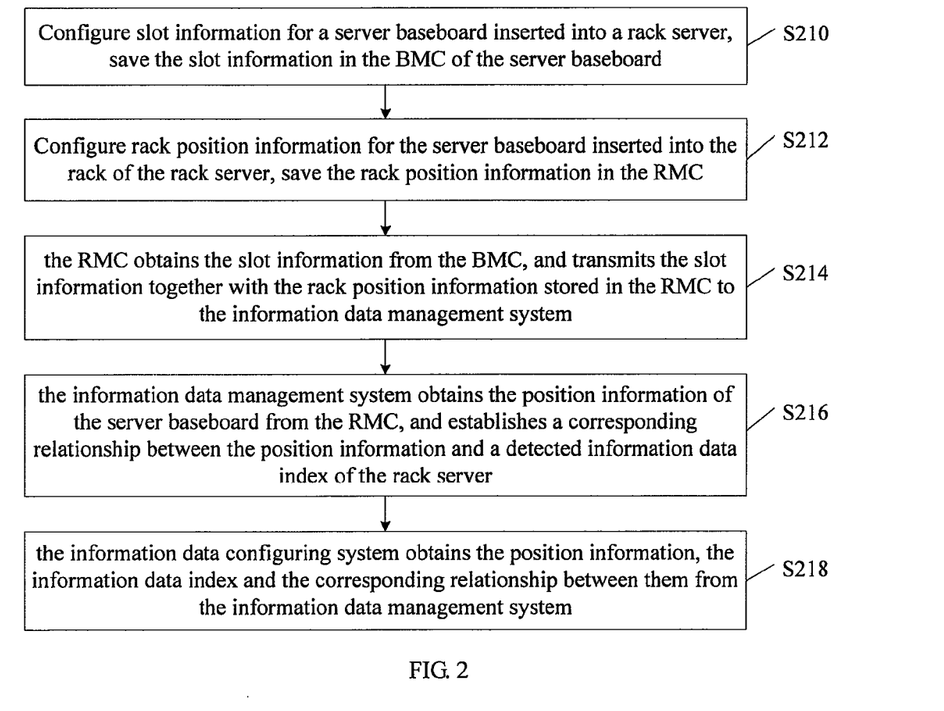
FIG. 2 is a flowchart illustrating a method for managing server information data according to a second embodiment of the present invention.

FIG. 2 is a flowchart illustrating a method for managing server information data according to a second embodiment of the present invention. In this embodiment, the controller storing the position information of the server baseboard is an RMC. As shown in FIG. 2, the method includes the following steps.

In step S210, slot information is configured for a server baseboard inserted into a rack server, the slot information is saved in a BMC of the server baseboard.

In a practical implementation, for the server baseboard inserted into the rack of the rack server, its slot information may be automatically configured through a Dual In-line Package (DIP) switch on the rack of the rack server. Alternatively, the slot information for the server baseboard may be configured through a management software platform externally connected with the rack server.

In step S212, rack position information is configured for the server baseboard inserted into the rack of the rack server. Then, the rack position information is saved in the RMC.

In a practical application, the rack position information for the server baseboard in step S212 may be configured through a local human-computer interaction interface of the RMC. Or, the rack position information for the server baseboard may be configured through the management software platform externally connected with the rack server.

In step S214, the RMC obtains the slot information from the BMC, and transmits the slot information together with the rack position information stored in the RMC to the information data management system.

In this embodiment, the RMC performs the transmission of the server baseboard's position information, which includes the slot information and the rack position information to the information data management system.

In step S216, the information data management system obtains the position information of the server baseboard from the RMC, and establishes a corresponding relationship between the position information and a detected information data index of the rack server.

Herein, the information data management system may detect the information data index of the rack server where the server baseboard is inserted when the rack server is power on. The information data index may be a frame number of the rack server where the server baseboard is inserted.

In step S218, the information data configuring system obtains the position information, the information data index and the corresponding relationship between them from the information data management system.

Step S216 and S218 in this embodiment are respectively the same as step S110 and S112 in FIG. 2 and will not be repeated herein.

In particular, the information data configuring system may save the position information, the information data index and the corresponding relationship between them obtained from the information data management, and provides a query interface for a user to query about information data in the information data configuring system.

Figure 3:
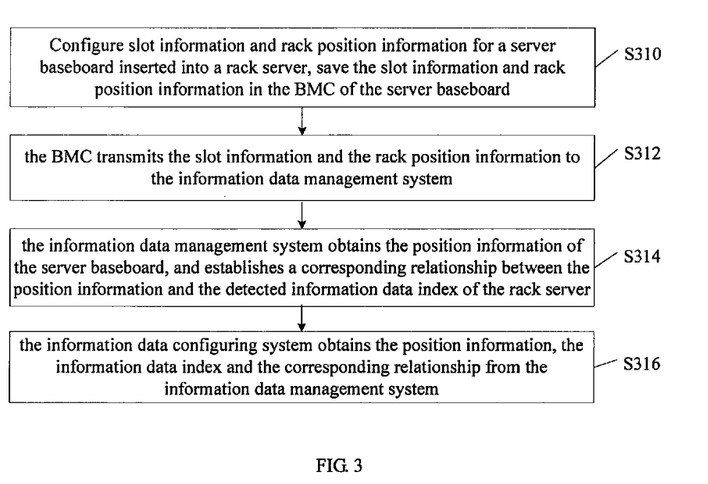
FIG. 3 is a flowchart illustrating a method for managing server information data according to a third embodiment of the present invention.

FIG. 3 is a flowchart illustrating a method for managing server information data according to a third embodiment of the present invention. In this embodiment, the controller storing the position information of the server baseboard is a BMC. As shown in FIG. 3, the method includes the following steps.

In step S310, slot information and rack position information is configured for a server baseboard inserted into a rack server, then the slot information and rack position information is saved in the BMC of the server baseboard.

In a practical implementation, for the server baseboard inserted into the rack of the rack server, its slot information may be automatically configured through a DIP switch on the rack of the rack server. Alternatively, the slot information for the server baseboard may be configured through a management software platform externally connected with the rack server.

In one example, the rack position information for the server baseboard in step S310 may be configured through a local human-computer interaction interface of the BMC. In another example, the rack position information for the server baseboard may be configured through the management software platform externally connected with the rack server.

In step S312, the BMC transmits the slot information and the rack position information to the information data management system.

In this embodiment, the BMC may perform the configuration for both the slot information and the rack position information. And the BMC may also transmit both the slot information and the rack position information to the information data management system. As such, an intermediate relay by the RMC may be skipped in the transmission.

In step S314, the information data management system obtains the position information of the server baseboard, and establishes a corresponding relationship between the position information and a detected information data index of the rack server.

In step S316, the information data configuring system obtains the position information, the information data index and the corresponding relationship from the information data management system.

Step S314 and S316 are respectively the same as step S110 and S112 in FIG. 1 and will not be repeated herein.

In particular, the information data configuring system may save the position information, the information data index and the corresponding relationship between them obtained from the information data management, and provides a query interface for a user to query about information data in the information data configuring system.

It can be seen from the above that, embodiment of the present invention provide systems and methods for managing server information data intelligently and efficiently. For example, the information data configuration system automatically obtains the position information of the server baseboard on the rack server and correlates the position information with the detected information data index of the rack server. Then, the information data configuration system provides the position information, the information data index, and the corresponding relationship between the position information and the information data index to the information data management system. An embodiment of the present invention further provides a system for managing server information data. Hereinafter, the system for managing server information data will be described in further detail with reference to FIG. 4 to FIG. 6.

Figure 4:
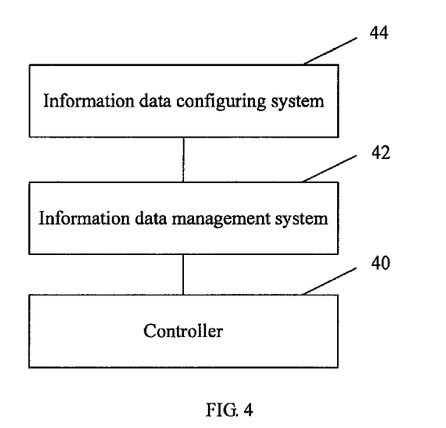
FIG. 4 is a schematic diagram illustrating a system for managing server information data according to the first embodiment of the present invention.

FIG. 4 is a schematic diagram illustrating a system for managing server information data according to the first embodiment of the present invention.

As shown in FIG. 4, the system includes: a controller 40, an information data management system 42 and an information data configuring system 44.

The controller 40 is adapted to store position information of a server baseboard. In a practical application, the position information may include rack position information (usually referred to as Rack ID) and slot information (usually referred to as Slot ID). The rack information may further include the following fields: "city+engine room+floor+rack row+rack number". The slot information may include the following fields: "seat". Therefore, complete position information of the server baseboard may include: "city+engine room+floor+rack row+rack number+seat". For example, a position of the server baseboard may be "Shenzhen Telecom Shahe IDC engine room 5th floor row A rack 03 seat 1". In particular, each filed in the position information may be denoted by a digital code in the embodiment of the present invention. For example, for the field "city", different cities may correspond to different digital codes. For example, "Shenzhen" may be denoted by "755", "Dongguan" may be denoted by "769". Other fields in the position information may be expressed in a similarly way. For example, the aforementioned "Shenzhen Telecom Shahe IDC engine room 5th floor row A rack 03 seat 1" may be expressed by digital codes "7550105010301".

In a practical application, the controller 40 may be an RMC or a BMC.

The information data management system 42 is connected with the controller 40 The information data management system 42 is adapted to obtain the position information of the server baseboard from the controller 40, and to establish a corresponding relationship between the position information and a detected information data index of the rack server. In a practical application, the information data management system 42 may correlate the position information and the information data index of the rack server through a table so as to establish the corresponding relationship.

The information data configuring system 44 is connected with the information data management system 42, and is adapted to obtain the position information, the information data index and the corresponding relationship from the information data management system 42.

The information data configuring system 44 is further adapted to save the corresponding relationship and to provide a query interface for a user to query about information data stored in the information data configuring system. In a practical implementation, the information data configuring system 44 may provide a web platform for the user to query about the information data.

Figure 5:
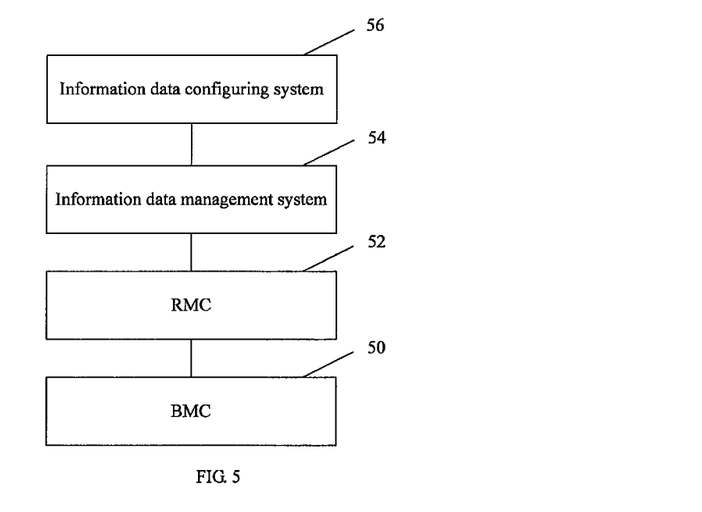
FIG. 5 is a schematic diagram illustrating a system for managing server information data according to the second embodiment of the present invention.

FIG. 5 is a schematic diagram illustrating a system for managing server information data according to the second embodiment of the present invention. In this embodiment, the position information includes rack position information and slot information. The controller is the RMC. As shown in FIG.

5, the system in this embodiment includes a BMC 50, an RMC 52, an information data management system 54 and an information data configuring system 56.

The BMC 50 is adapted to obtain the slot information of the server baseboard in the rack of the rack server through a DIP switch on the rack of the rack server, or through a management platform externally connected with the rack server. The BMC 50 is also adapted to store the slot information.

The RMC 52 is adapted to obtain the slot information of the server baseboard from the BMC 50, and to obtain the rack position information of the server baseboard from a local human-computer interaction interface of the RMC 52 or from an externally connected management software platform. The RMC 52 is also adapted to transmit the slot information and the rack position information to the information data management system 54.

Connected with the RMC 52, the information data management system 54 is adapted to obtain the position information of the server baseboard from the RMC 52, and to establish a corresponding relationship between the position information and a detected information data index of the rack server. In a practical implementation, the information data management system 54 in FIG. 5 is the same as the information data management system 42 in FIG. 4 and will not be repeated herein.

The information data configuring system 56 is connected with the information data management system 54, and adapted to obtain the position information, the information data index and the corresponding relationship from the information data management system 54.

The information data configuring system 56 is further adapted to save the corresponding relationship and provide a query interface for a user to query information data in the information data configuring system.

In a practical application, the information data configuring system 56 in FIG. 5 is the same as the information data configuring system 44 in FIG. 4, and will not be repeated herein.

Figure 6:
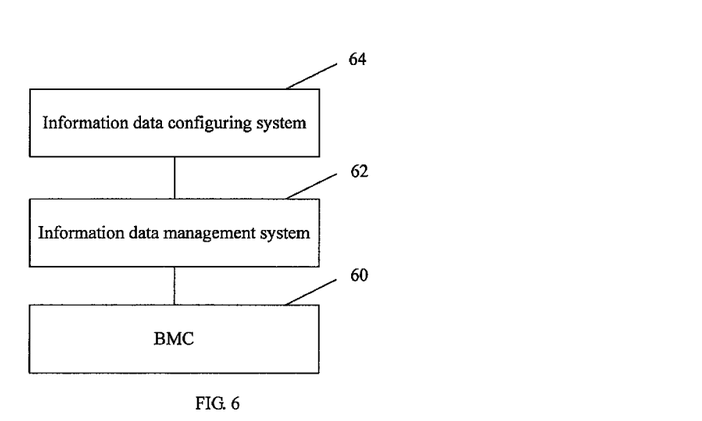
FIG. 6 is a schematic diagram illustrating a system for managing server information data according to the third embodiment of the present invention.

FIG. 6 is a schematic diagram illustrating a system for managing server information data according to the third embodiment of the present invention. In this embodiment, the position information includes rack position information and slot information. The controller is the BMC. As shown in FIG. 6, the system in this embodiment includes a BMC 60, an information data management system 62 and an information data configuring system 64.

The BMC 60 is adapted to obtain the slot information of the server baseboard inserted into the rack of the rack server through a DIP switch on the rack of the rack server or through a management software platform externally connected with the rack server. The BMC 60 is also adapted to obtain the rack position information of the server baseboard through a local human-computer interaction interface of the BMC 60 or through the management software platform externally connected with the rack server.

Connected with the BMC 60, the information data management system 62 is adapted to obtain the position information of the server baseboard from the BMC 60. The information data management system 62 is also adapted to establish a corresponding relationship between the position information and a detected information data index of the rack server. In a practical application, the information data management system 62 in FIG. 6 may be the same as the information data management system 42 and will not be repeated herein.

The information data configuring system 64 is connected with the information data management system 62, and is also adapted to obtain the position information, the information data index and the corresponding relationship from the information data management system 62.

The information data configuring system 64 is further adapted to save the corresponding relationship and to provide a query interface for a user to query about information data in the information data configuring system. In a practical application, the information data configuring system 64 in FIG. 6 is the same as the information data configuring system 44 in FIG. 4, and will not be repeated herein.

It can be seen from the above that, in the system for managing server information data provided by the embodiment of the present invention, the information data configuration system automatically obtains the position information of the server baseboard on the rack server and correlates the position information with the detected information data index of the rack server, and then provides the position information, the information data index and the corresponding relationship to the information data management system. Part or all contents of the technical solution provided by the above embodiments may be implemented by one or more software program. The one or more software program may be stored in a machine readable storage medium, such as a computer disk, CD or floppy disk, and may be executed by one or more computer processors.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing server information data, comprising:
    obtaining, by an information data management system, position information of a server baseboard from a controller storing the position information of the server baseboard inserted in a rack of a rack server; wherein the position information of the server baseboard comprises position information of the rack and slot information of the server baseboard in the rack;
    wherein the slot information is configured for the server baseboard by: configuring the slot information for the server baseboard through a Dual In-line Package (DIP) switch on the rack of the rack server, and
    establishing a corresponding relationship between the position information of the server baseboard and an information data index of the rack server; and
    obtaining, by an information data configuring system, the position information of the server baseboard, the information data index and the corresponding relationship between the position information of the server baseboard and the information data index from the information data management system.

2. The method of claim 1, further comprising:
    storing, by the information data configuring system, the position information of the server baseboard and the information data index, and providing a query interface of the information data configuring system.

3. The method of claim 1, wherein the controller storing the position information of the server baseboard is a Rack Management Controller (RMC) or a Baseboard Management Controller (BMC).

4. The method of claim 1,
wherein the position information of the rack is configured for the server baseboard inserted in the rack of the rack server by:
configuring the position information of the rack for the server baseboard through a local human-computer interaction interface of the RMC, or
configuring the position information of the rack for the server baseboard through the management software platform externally connected with the rack server.

5. The method of claim 1, wherein the controller storing the position information of the server baseboard is a RMC;
wherein obtaining the position information of the server baseboard from the controller storing the position information of the baseboard by the information data management system further comprising:
storing the configured slot information in a BMC of the server baseboard inserted in the rack of the rack server and storing the configured position information of the rack in the RMC; and
obtaining, by the RMC, the slot information from the BMC, and transmitting, by the RMC, the slot information and the position information of the rack stored in the RMC to the information data management system.

6. The method of claim 1, wherein the controller storing the position information of the server baseboard is a BMC of the server baseboard inserted in the rack of the rack server;
wherein obtaining the position information of the server baseboard from the controller storing the position information of the baseboard by the information data management system further comprising:
storing the configured slot information and the configured position information of the rack in the BMC; and
transmitting, by the BMC, the slot information and the position information of the rack to the information data management system.

7. The method of claim 1, further comprising:
detecting, by the information data management system, the information data index of the rack server when the rack server is power on.

8. A system for managing server information data, comprising:
a controller, adapted to storing position information of a server baseboard inserted in a rack of a rack server; wherein the position information of the server baseboard comprises position information of the rack and slot information of the server baseboard in the rack; wherein the slot information is configured for the server baseboard by: configuring the slot information for the server baseboard through a Dual In-line Package (DIP) switch on the rack of the rack server;
an information data management system, connected with the controller, adapted to obtain the position information of the server baseboard from the controller, and establish a corresponding relationship between the position information of the server baseboard and an information data index of the rack server; and
an information data configuring system, connected with the information data management system, adapted to obtain the position information of the server baseboard, the information data index and the corresponding relationship between the position information of the server baseboard and the information data index from the information data management system.

9. The system of claim 8, wherein the information data configuring system is further adapted to store the position information of the server baseboard and the information data index, and provide a query interface of the information data configuring system.

10. The system of claim 8, wherein the controller is a Rack Management Controller (RMC) or a Baseboard Management Controller (BMC).

11. The system of claim 10, wherein the controller is the RMC, the system further comprises:
a BMC, adapted to obtain the slot information of the server baseboard from the DIP switch on the rack of the rack server;
the RMC is further adapted to obtain the slot information from the BMC, and obtain the position information of the rack from a local human-computer interaction interface of the RMC or from the management software platform externally connected with the rack server.

12. The system of claim 11, wherein the RMC is further adapted to transmit the obtained slot information and the position information of the rack to the information data management system.

13. The system of claim 10, wherein the BMC is further adapted to:
obtain the slot information of the server baseboard from the DIP switch on the rack of the rack server; and
obtain the position information of the rack from a local human-computer interaction interface of the BMC or from the management software platform externally connected with the rack server.

14. The system of claim 13, wherein the BMC is further adapted to transmit the slot information and the position information of the rack to the information data management system.

15. The system of claim 8, wherein the information data management system is further adapted to detect the information data index of the rack server when the rack server is power on.

16. A non-transitory machine-readable storage medium, comprising machine-readable instructions executable by a processor to:
obtain position information of a server baseboard from a controller storing the position information of the server baseboard inserted in a rack of a rack server; wherein the position information of the server baseboard comprises position information of the rack and slot information of the server baseboard in the rack;
wherein the slot information is configured for the server baseboard by: configuring the slot information for the server baseboard through a Dual In-line Package (DIP) switch on the rack of the rack server, establish a corresponding relationship between the position information of the server baseboard and an information data index of the rack server; and
provide the information data index and the corresponding relationship between the position information of the server baseboard and the information data index to an information data configuring system.

17. The non-transitory machine-readable storage medium of claim 16, further comprising machine-readable instructions executable by the processor to:
detect the information data index of the rack server when the rack server is power on.

18. The non-transitory machine-readable storage medium of claim 16, wherein information of the server baseboard;
the non-transitory machine-readable storage medium further comprises machine-readable instructions executable by the processor to:

obtain the slot information and the position information of the rack from a Rack Management Controller (RMC).

19. The non-transitory machine-readable storage medium of claim 16, wherein
the non-transitory machine-readable storage medium further comprises machine-readable instructions executable by the processor to:
obtain the slot information and the position information of the rack from a Baseboard Management Controller (BMC).

* * * * *